United States Patent
Beaver

(10) Patent No.: US 7,630,597 B2
(45) Date of Patent: Dec. 8, 2009

(54) MASTER/SLAVE MULTIPLE PATH OPTICAL SWITCHING DEVICE

(75) Inventor: Robert Beaver, Brampton (CA)

(73) Assignee: Rogers Communications Inc. (CA)

( * ) Notice: Subject to any disclaimer, the term of this patent is extended or adjusted under 35 U.S.C. 154(b) by 6 days.

(21) Appl. No.: 11/442,863

(22) Filed: May 30, 2006

(65) Prior Publication Data

US 2007/0280696 A1    Dec. 6, 2007

(51) Int. Cl.
G02B 6/36 (2006.01)
(52) U.S. Cl. .......................................... 385/16; 398/12
(58) Field of Classification Search .................. 398/45, 398/33
See application file for complete search history.

(56) References Cited

U.S. PATENT DOCUMENTS

| | | | | |
|---|---|---|---|---|
| 3,864,533 A | * | 2/1975 | Erlund | 379/2 |
| 3,882,456 A | * | 5/1975 | Takada | 178/69 G |
| 4,393,493 A | * | 7/1983 | Edwards | 370/228 |
| 4,497,054 A | * | 1/1985 | Read | 370/220 |
| 4,701,907 A | * | 10/1987 | Collins | 370/371 |
| 4,886,335 A | * | 12/1989 | Yanagawa et al. | 385/16 |
| 4,912,706 A | * | 3/1990 | Eisenberg et al. | 370/507 |
| 5,299,293 A | * | 3/1994 | Mestdagh et al. | 398/24 |
| 5,327,275 A | * | 7/1994 | Yamane et al. | 398/2 |
| 5,687,013 A | * | 11/1997 | Henmi | 398/167 |
| 5,710,846 A | * | 1/1998 | Wayman et al. | 385/17 |
| 5,712,942 A | * | 1/1998 | Jennings et al. | 385/134 |
| 5,717,796 A | * | 2/1998 | Clendening | 385/24 |
| 5,936,938 A | * | 8/1999 | Weldon et al. | 370/228 |
| 6,421,149 B2 | * | 7/2002 | Tervonen et al. | 398/9 |
| 6,442,133 B2 | * | 8/2002 | Owada | 370/219 |
| 6,563,979 B2 | * | 5/2003 | Feinberg et al. | 385/24 |
| 6,567,579 B2 | * | 5/2003 | Foltzer | 385/24 |
| 6,766,113 B1 | * | 7/2004 | Al-Salameh et al. | 398/30 |
| 6,829,437 B2 | * | 12/2004 | Kirby | 398/57 |
| 6,882,765 B1 | * | 4/2005 | Erickson et al. | 385/16 |
| 6,941,247 B2 | * | 9/2005 | Voigt et al. | 702/188 |
| 6,944,362 B2 | * | 9/2005 | Jasti | 385/16 |
| 6,965,735 B2 | * | 11/2005 | Wu et al. | 398/12 |
| 6,999,411 B1 | * | 2/2006 | Brewer et al. | 370/220 |
| 7,065,297 B2 | * | 6/2006 | Horachi et al. | 398/70 |
| 7,212,551 B1 | * | 5/2007 | Beshai et al. | 370/509 |
| 7,215,666 B1 | * | 5/2007 | Beshai et al. | 370/380 |
| 7,286,758 B2 | * | 10/2007 | Shimada et al. | 398/33 |
| 2003/0035175 A1 | * | 2/2003 | Wu et al. | 359/139 |
| 2003/0123493 A1 | * | 7/2003 | Takahashi | 370/539 |
| 2003/0185205 A1 | * | 10/2003 | Beshai | 370/370 |
| 2004/0005152 A1 | * | 1/2004 | Horachi et al. | 398/79 |
| 2004/0052527 A1 | * | 3/2004 | Kirby | 398/57 |
| 2004/0091264 A1 | * | 5/2004 | Beshai | 398/47 |
| 2006/0126996 A1 | * | 6/2006 | Beshai | 385/17 |
| 2006/0127087 A1 | * | 6/2006 | Kasai et al. | 398/45 |

* cited by examiner

*Primary Examiner*—Frank G Font
*Assistant Examiner*—Peter Radkowski
(74) *Attorney, Agent, or Firm*—Krugliak, Wilkins, Griffiths & Dougherty Co., L.P.A.; David P. Dureska; Brent L. Moore

(57) ABSTRACT

A system and method is provided for controlling switching between multiple primary and diverse optical paths in an optical switching system. The system has a primary upstream optical path, a diverse upstream optical path, one or more primary downstream optical paths, and one or more diverse downstream optical paths. The method comprises the steps of monitoring a signal level of the primary upstream optical path, determining if the signal level of the primary upstream optical path is above a set threshold, and automatically switching both upstream and downstream paths from the primary optical paths to the diverse optical paths if the signal level of the primary upstream optical path is below the predetermined threshold.

18 Claims, 4 Drawing Sheets

MASTER/SLAVE MULTIPLE PATH OPTICAL SWITCHING DEVICE

FIELD OF THE INVENTION

This application relates generally to optical fiber network route protection using an optical switching device and, more specifically, to using an optical switching device to increase network availability between transmit and receive devices that have fiber route diversity.

BACKGROUND OF THE INVENTION

As cable distribution systems progress from conventional analog and digital coaxial implementations to fiber optic based networks, cable distribution systems are increasingly becoming the main digital backbone that interconnects homes and businesses with service providers of many sorts. Cable communications networks now provide residential and business customers with all of their entertainment and communications services including broadcast analog and digital television, video on demand, HDTV, CD quality music, hi-speed internet, telephone, T1 services, 10/100/1000 Mbps native Ethernet services, etc. Therefore, the reliability of these networks is becoming increasingly critical. As competition mounts between cable companies and alternative service providers such as telephone and power companies, each minute of service outage experienced by cable subscribers is detrimental to the cable company. With the use of optical fiber route diversity in the network, downtime caused by fiber cuts can be mitigated by transferring signals from the damaged working fiber route to the undamaged fiber route. However, conventional route diversity systems require an operator to arrive at the appropriate location to physically switch from one fiber route to another.

Therefore, there remains a need for improved fiber optic route protection technology that provides for improved continuity of service (i.e., less downtime).

SUMMARY OF THE INVENTION

The present invention provides a system and method for providing optical fiber route protection between transmit and receive devices such as cable communications hybrid fiber coaxial (HFC) optical nodes and other optical communications devices such as those that provide Ethernet transport over optical fiber.

According to one aspect of the present invention, there is provided an optical switching system. The optical switching system comprises a master module having a controller, a transmitter portion for use with a transmitter, and a receiver portion for use with a receiver; and a slave module having a controller and one or more transmitter portions for use with transmitters. The slave module controller is connected to the master module controller with a control line. The master module transmitter portion has a first port for connection to a primary downstream path and a second port for connection to a diverse downstream path. The master module receiver portion has a first port for connection to a primary upstream path and a second port for connection to a diverse upstream path. Each slave module transmitter portion has a first port for connection to an additional primary downstream path and a second port for connection to an additional diverse downstream path. The optical switching system further comprises a first optical coupler for detecting an optical signal level provided to the master module receiver portion first port and providing a first electrical signal to a first input of the master module controller and a second optical coupler for detecting an optical signal level provided to the master module receiver portion second port and providing a second electrical signal to a second input of the master module controller. The optical switching system further comprises one or more switches responsive to the master module controller for switching between the master module first and second ports.

According to another aspect of the present invention, there is provided an optical cable distribution system. The optical cable distribution system comprises a head end having a master module and one or more slave modules. The master module has a controller, a transmitter portion for use with a transmitter, and a receiver portion for use with a receiver. The slave module has a controller and one or more transmitter portions for use with transmitters. A control line connects the slave module controller to the master module controller. The master module transmitter portion has a first port connected to a first end of a primary downstream fiber and a second port connected to a first end of a diverse downstream fiber. The master module receiver portion has a first port connected to a first end of a primary upstream fiber and a second port connected to a first end of a diverse upstream fiber. Each slave module transmitter portion has a first port connected to a first end of an additional primary downstream fiber and a second port connected to a first end of an additional diverse downstream fiber. The optical cable distribution system further comprises a first optical coupler for detecting an optical signal level provided to the master module receiver portion first port and providing a first electrical signal to a first input of the master module controller and a second optical coupler for detecting an optical signal level provided to the master module receiver portion second port and providing a second electrical signal to a second input of the master module controller. The optical cable distribution system further comprises one or more switches responsive to the master module controller for switching between the master module first and second ports.

According to another aspect of the present invention, there is provided a method for controlling switching between primary and diverse optical paths in an optical switching system. The system has a primary upstream optical path, a diverse upstream optical path, two or more primary downstream optical paths, and two or more diverse downstream optical paths. The method comprises the steps of monitoring a signal level of the primary upstream optical path, determining if the signal level of the primary upstream optical path is above a set threshold, and automatically switching from the primary optical paths to the diverse optical paths if the signal level of the primary upstream optical path is below the predetermined threshold.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, embodiments of the present invention, and in which.

Similar references are used in different figures to denote similar components.

DETAILED DESCRIPTION OF THE EMBODIMENTS

Figure 1:
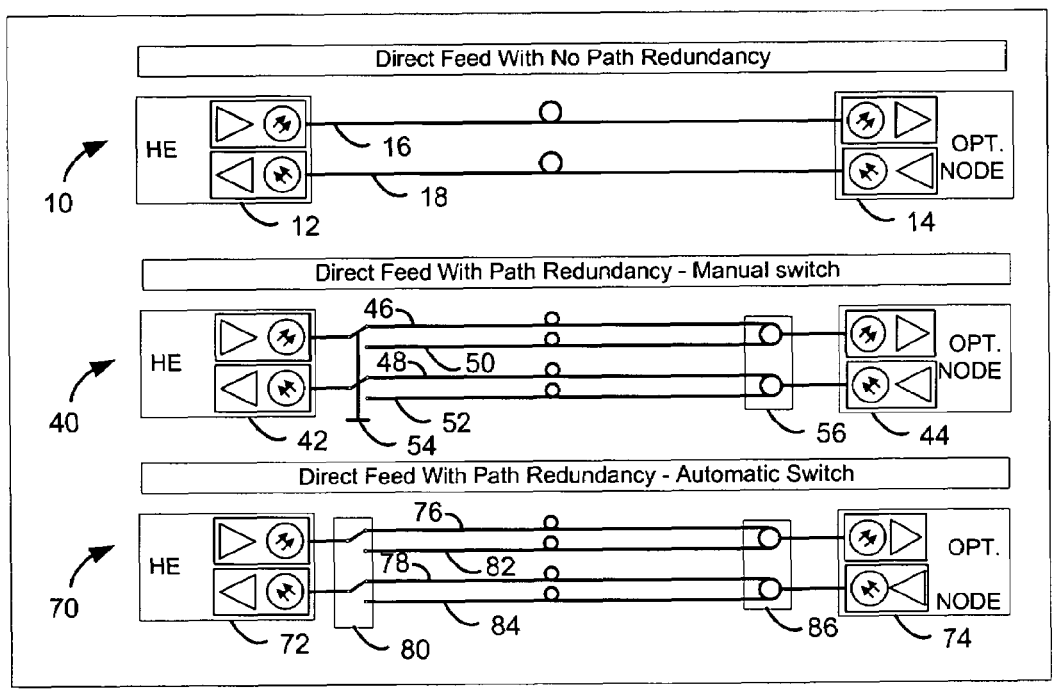
FIG. 1 is a schematic view of three possible approaches of connecting a direct feed optical node to a head end of a cable distribution system.

Reference is first made to FIG. 1, which shows a schematic view of three possible approaches of connecting a direct feed optical node to a head end of a cable distribution network. A first approach 10 is illustrated showing a direct feed with no path diversity. In this approach, a head end 12 is directly connected to an optical node 14 using one downstream path 16 and one upstream path 18. Each of the paths 16 and 18 is implemented using an optical fiber. This is the simplest possible optical configuration, which involves no path diversity. In the event that one of either the downstream path 16 or the upstream path 18 is damaged or broken, service is interrupted until such time as the damaged fiber can be repaired or replaced.

A second approach 40 is illustrated showing a direct feed optical node with path diversity and employing a manual switch. In this case, a head end 42 is connected to an optical node 44 using a primary downstream path 46 and a primary upstream path 48. In the event that the connection between the head end 42 and the optical node 44 fails because of damage to either of the paths 46 or 48, connectivity may be restored when an operator switches to a diverse downstream path 50 and a diverse upstream path 52 using a manual switch 54. The primary downstream path 46 and the diverse downstream path 50 are spliced together and coupled to the optical node 44 using a Fiber Optic Splice Closure (FOSC) 56. Likewise, the primary upstream path 48 and the diverse upstream path 52 are spliced together and coupled to the fiber optic node 44 using the FOSC 56. Typically, primary and diverse paths are segregated and placed in different sheaths (e.g., the primary paths 46 and 48 are placed in one fiber sheath and the diverse paths 50 and 52 are placed in a different fiber sheath) such that if one of the sheaths is broken or damaged, the other sheath is not likely to be broken or damaged, particularly if the sheaths are physically separated; for example, where the sheaths are placed a distance apart and/or in different conduits. With the second approach 40, in the event that one of either the primary downstream path 46 or the upstream path 48 is damaged or broken, service is interrupted until such time as an operator can manually switch to the diverse paths 50 and 52. In practice, the manual switch 54 represents a manual patching exercise that requires the operator to unplug fiber patch cords from ports for the primary paths on a patch panel and plug the cords into other ports, such as for the diverse paths.

A third approach 70 is illustrated showing a direct feed optical node with path diversity and employing an automatic switch in accordance with one embodiment of the present invention. In this case, a head end 72 is connected to an optical node 74 using a primary downstream path 76 and a primary upstream path 78. In the event that the connection between the head end 72 and the optical node 74 fails because of damage to either of the paths 76 or 78, connectivity may be automatically restored using an optical switching device 80, for example an automatic switch, that switches to a diverse downstream path 82 and a diverse upstream path 84. The primary downstream path 76 and the diverse downstream path 82 are spliced together and coupled to the optical node 74 using a FOSC 86. Likewise, the primary upstream path 78 and the diverse upstream path 84 are spliced together and coupled to the optical node 74 using the FOSC 86. With the third approach 70, in the event that one of either the primary downstream path 76 or the primary upstream path 78 is damaged or broken, service is interrupted only briefly; for example, only for a service interruption detection time in addition to the switching time of the automatic switch 80. The switch 80 is designed such that the switching time of the switch 80 is small enough so that no noticeable service interruption occurs. In case of a primary fiber cut where the primary downstream path 76 and the primary upstream path 78 are physically severed, the optical switching device 80 serves to assure that the node 74 re-connection is performed in the minimal time possible, in order to avoid service interruption. In the case of digital phone system deployment, the target is to have no dropped calls.

Another possible fiber route protection scheme includes implementing redundant transmitters and receivers at each end point of the network (e.g., for the diverse paths 82 and 84) and switching in the electrical domain as opposed to the optical domain. This approach is expensive but offers a low repair time and good system availability since the transmitters and receivers are also protected along with the optical fiber route. This approach suffers from a high cost and greater space and power requirements at the end points of the fiber routes.

Figure 2:
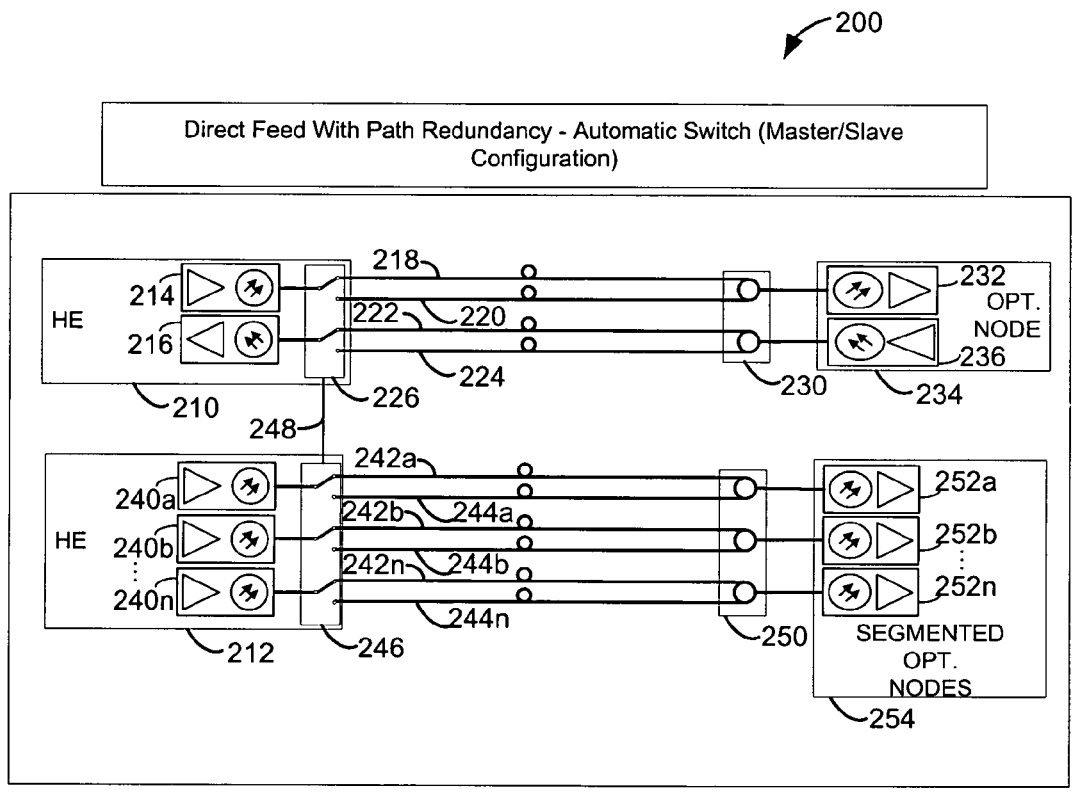
FIG. 2 is a schematic view of an exemplary implementation of a master/slave configured direct optical feed employing path diversity and automatic switching in accordance with one embodiment of the invention.

Reference is next made to FIG. 2, which shows a schematic view of an exemplary implementation of a system 200 having a master/slave configured direct optical feed with path diversity and automatic switching that also accounts for downstream path segmentation in accordance with one embodiment of the invention. The system 200 includes a master module 210 and a slave module 212. Both the master module 210 and the slave module 212 form part of a head end of a cable distribution system (not shown). The master module 210 includes an optical transmitter portion 214 and an optical receiver portion 216. The optical transmitter portion 214 is coupled to either a primary downstream path 218 or a diverse downstream path 220 and the optical receiver portion 216 is coupled to either a primary upstream path 222 or a diverse upstream path 224. A switch 226 performs the switching between the primary paths 218 and 222 and the diverse paths 220 and 224. The primary downstream path 218 and the diverse downstream path 220 are spliced together at a FOSC 230 and connected to a receiver 232 located in an optical node 234. Likewise, the primary upstream path 222 and the diverse upstream path 224 are spliced together at the FOSC 230 and connected to a transmitter 236 located in the optical node 234.

The slave module 212 is responsible for distributing optical feeds to segmented downstream nodes. Segmented downstream nodes refers to the situation where the nodes are implemented as either optically segmented physical optical nodes or as multiple physical nodes. The slave module 212 is designed to be used in the case where an optical node is segmented on the downstream path. Segmentation is desirable as it offers a wider array of services to different zones in a distribution network, as well as provides for increased bandwidth to each zone. Downstream path segmentation occurs where multiple fibers carrying similar information are placed side by side, typically in the same sheath. The content carried by the fibers differs only incrementally, offering slightly different content for different regions in the case of digital television, or offering separate pipes to different regions or zones for increased bandwidth in the case of Internet or telephone service. Each of the multiple fibers typically terminates at a separate FOSC and associated optical node, with each node corresponding to a certain zone or region in the cable distribution system. Even though each of the multiple fibers typically terminates at a separate FOSC and associated optical node that may be geographically separated, the multiple fibers share a sheath for at least a substantial portion of their lengths such that, if one of the fibers is cut or damaged, in all likelihood, more of the fibers will also be cut or damaged. In one embodiment, it is assumed that only the downstream path needs different fibers in the case of segmentation and the upstream path segmentation is done by using baseband digital return, as opposed to using segmentation. In another embodiment, such as where increased bandwidth is needed for upstream communications, segmentation could be added to the upstream path in the same manner as will be described for the downstream path.

Using the slave module 212, the system 200 employs a direct feed with path diversity and automatic switching that also switches segmented downstream feeds running through fibers residing in the same sheaths as the primary downstream path 218 and the diverse downstream path 220. In one embodiment, the slave module 212 includes one or more transmitters 240a-n, individually indicated as 240a, 240b, ..., 240n. Alternatively, there may be one or more slave modules 212 each containing one or more transmitters 240. Each of the transmitters 240 is coupled to either a respective primary downstream path 242, individually indicated as 242a, 242b, ..., 242n, or a diverse downstream path 244, individually indicated as 244a, 244b, ..., 244n. A switch 246 is controlled, either directly or indirectly, by the switch 226 using a control signal over a control path 248. The switch 246 performs the switching between the primary paths 242 and the diverse paths 244. The primary downstream paths 242 and the diverse downstream paths 244 are respectively spliced together at a FOSC 250 and connected to respective receivers 252, individually indicated by 252a, 252b, ..., 252n, located in an optical node 254. Alternatively, in the case where the segmented downstream paths 242 and 244 serve zones or regions that are geographically remote, there may be up to n FOSCs 250 each connected to the respective receivers 252, with each of the receivers 252 located in up to n physically isolated optical nodes. The operation of the system 200 is described in more detail below in connection with FIGS. 3 and 4.

While the use of FOSCs 230 and 250 is described, within the FOSCs, the primary and diverse fibers may be connected to two ports of an optical coupler with a third port serving as the final input or output, depending at which end of the fibers the optical coupler is implemented. This optical coupler may be placed in a FOSC, such as the FOSCs 230 and 250, or in an optical node housing or in some other enclosure such as a cabinet, room, etc.

In one embodiment, the system 200 functions similarly to existing optical switches by detecting a loss of light on the primary upstream path 222 using a mini receiver that detects light, located in the switch 226, and switching from the primary paths 222 and 218 to the diverse paths 220 and 224. The system 200 adds additional functionality by switching another or many (e.g., limited only by practicality or design) associated paths, such as the paths 242 to the paths 244, virtually simultaneously so that the system 200 effects fiber route protection in the part of the system 200 that is in the optical domain. While the system 200 is referred to as a switching system having the transmitters 214, and 240 and the receiver 216 shown to be adjacent to the switches 226 and 246, the switches need not be adjacent the transmitters and receivers and need not be located in the master module 210 and slave module 212.

In some embodiments, use of the switches 226 and 246 serves to allow upstream and downstream switching of optical paths for fiber route protection in the optical portion of the system 200. This approach may also be applied to dense wavelength division multiplexing (DWDM) convergence points in cable communications networks as well as optical signal convergence points in Passive Optical Networks (PONs) or Fibre to the Home (FTTH) networks that are currently being deployed by conventional telephone service providers and others. While PONs are typically point to point configurations with no redundancy, a move to redundancy for some parts of these networks (e.g., the parts that are the highest risk where failure points have the largest impact) is desirable to increase reliability.

Figure 3:
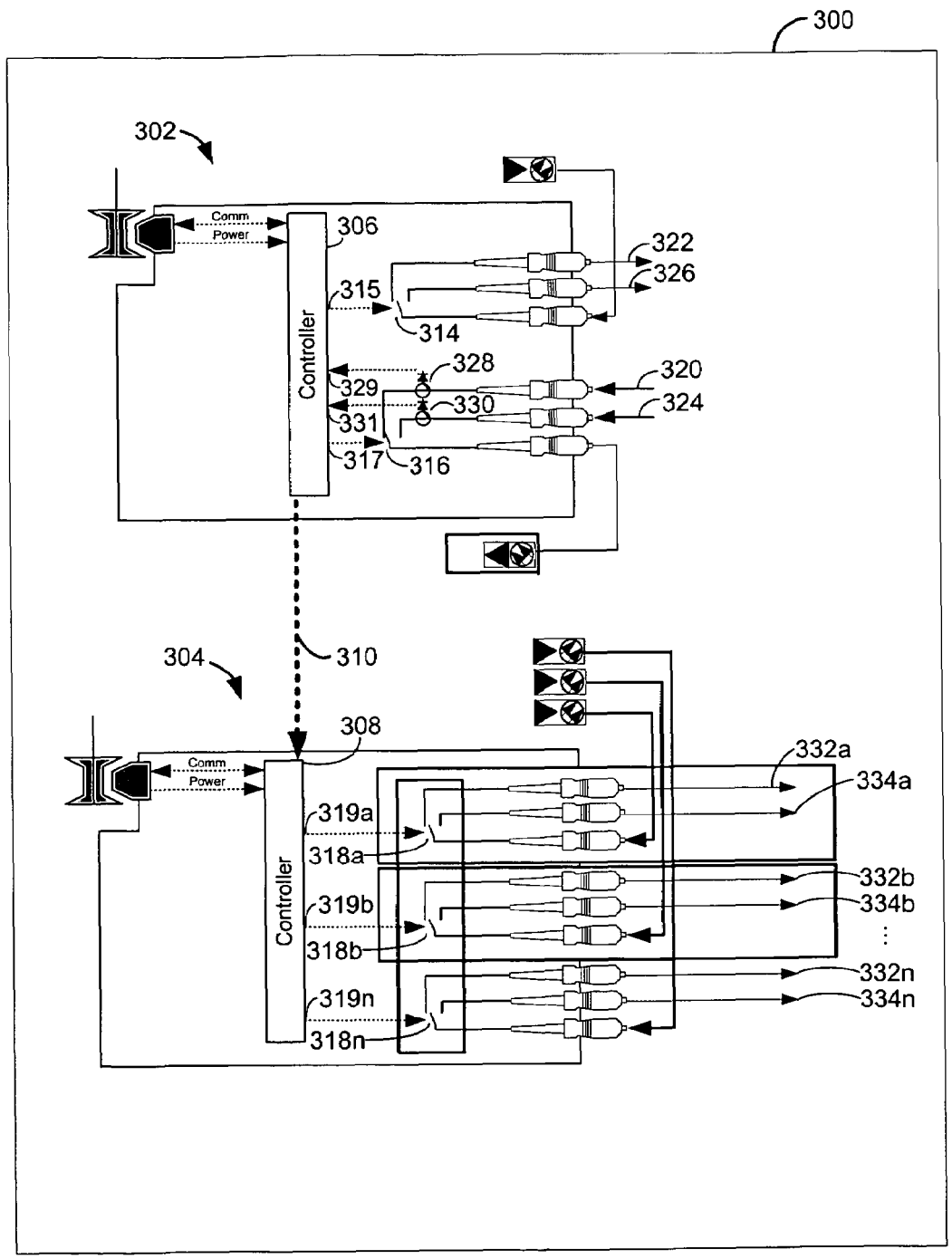
FIG. 3 is a more detailed schematic view of the head end and switching portion of the master/slave configured direct optical feed shown in FIG. 2.

Reference is next made to FIG. 3, which shows a schematic view of an Optical Switching System (OSS) 300 in accordance with one embodiment of the invention. FIG. 3 is a more detailed schematic view of the master module, slave module, and switching portion of the system 200 shown in FIG. 2. In one embodiment, the OSS 300 comprises a master/slave configured direct optical feed employing node segmentation on the downstream path and path diversity with automatic switching. The OSS 300 includes two modules, a master module 302 and a slave module 304. The master module 302 has a controller 306 and the slave module 304 has a controller 308. The controller 306 supplies a control signal to the controller 308 over a control line 310. The master module 302 is needed for each 1×1 optical node feed to be implemented in an optical cable distribution system and includes two optical switches, namely a downstream switch 314 and an upstream switch 316. In one embodiment, the switch 314 is controlled by a first controller output 315 supplying a first control signal and the switch 316 is controlled by a second controller output 317 supplying a second control signal. In one embodiment, the outputs 315 and 317 supplying the first and second control signals may be electrically coupled together or simultaneous triggered by code running on the controller 306, resulting in simultaneous action of the switches 314 and 316. The slave module 304 comprises a number of optical switches 318a-n, individually indicated as 318a, 318b, ..., 318n. The controller 308 provides a number of control signals at a number of outputs 319a-n, individually indicated as 319a, 319b, ..., 319n, to control the switches 318. The switches 318 are controlled, either directly or indirectly, by the controller 306 of master module 302 via the control signal supplied to the control line 310. When the controller 306 provides a control signal over the control line 310 to the controller 308 requesting that the controller 308 change the positions of the switches 318, the controller 308 responds by supplying the control signals 319. In one embodiment, any delay between triggering the control signals at the outputs 315 and 317 causing the tripping of the master module switches 314 and 316 and the triggering of the control signal on the control line 310 resulting in the triggering of the control signals on the outputs 319 that causes the tripping of the slave module switches 318 is kept below 2 milliseconds. While the switches 318 are shown as 3 separately controlled switches in the example provided by FIG. 3, the switches 318 may be integrated such that the switches 318 are controlled by a single control signal provided by the controller 308. In one embodiment, the slave module 304 has an initial single optical switch, such as the switch 318, and as the node segmentation requires, plug-in sub-modular switches may be installed, in order to minimize initial expenditure costs of an installation.

Optionally, additional optical switches (not shown) similar to the switch 318 may be plugged into the slave module 304, as the node is further segmented on the downstream path and more downstream paths are added. In one embodiment, all of the switching devices in the slave module 304 are electrically coupled together to form the single switch 318, thus resulting in simultaneous switching action. The downstream segmentation steps may include 1×; 2×; 4×; etc., configurations.

In one embodiment, the master module 302 of the optical switching system 300 has a primary port 320 for connection to a primary upstream path fiber and a primary port 322 for connection to a primary downstream path fiber, with the primary path fibers located in the same sheath and following the same route to the associated FOSC, such as the FOSC 230 shown in FIG. 2, adjacent to the node, such as the node 234 shown in FIG. 2. Therefore, it can be reasonably assumed that the detection of any cut or damage to the primary upstream path fiber means that the primary downstream path fiber has also been cut or damaged. The master module 302 further has a diverse port 324 for connection to a diverse upstream path fiber and a diverse port 326 for connection to a diverse downstream path fiber, with the diverse fibers placed together in the same sheath, but in a different sheath from the primary fibers. In one embodiment, the optical node, such as the optical node 234 shown in FIG. 2, is equipped with either analog upstream transmitters or with baseband digital return transmitters.

The master module 302 of the OSS 300 detects the optical input power on the primary upstream port 320 and the diverse upstream port 324 using optical couplers. An optical coupler 328 provides an electronic single strength signal related to an optical signal provided to the primary upstream port 320 to an input 329 of the controller 306 and an optical coupler 330 provides an electronic signal strength signal related to an optical signal provided to the diverse upstream port 324 to an input 331 of the controller 306. In normal operation, the input level of the primary upstream port 320 observed by the controller 306 is higher than a set threshold or within a range set by the operator. In one embodiment, the switching thresholds are operator configurable in 0.5 dB increments. The master module 302 switches 314 and 316 are shown in the position to allow both upstream and downstream optical traffic to pass through the primary ports 320 and 322. This position of the optical switches 314 and 316 is the default position in case the power to the master module 302 fails and is later restored. In the event that the primary upstream port 320 input level falls below the set threshold or is out of the set range, and the diverse upstream port 324 input is above the set threshold or is within the set range, logic or code running on and executed by the controller 306 interprets that the primary optical path (e.g., the upstream path connected to the port 320 and consequently the downstream path connected to the port 322) is damaged. The controller 306 then provides the control signals at the outputs 315 and 317 that triggers the optical switches 314 and 316 to change their positions to the diverse ports, thus using the diverse upstream port 324 and the diverse downstream port 326 instead of the primary ports 320 and 322. In one embodiment, the total switching time including the detection of the fault at the controller 306 corresponding to a broken or damaged primary upstream path and switching to the diverse paths on the ports 324 and 326 is below 20 ms. The master module 302 provides a control signal over the control line 310 to the slave module 304 causing the slave module 304 controller 308 to activate the switches 318 by providing the control signals at the outputs 319. In one embodiment, the switch 318 is activated within 2 ms of the activation of the switches 314 and 316, thus also switching from primary ports 332 to diverse ports 334 for the segmented downstream paths controlled by the slave module 304.

In the case that the primary upstream port 320 signal level becomes lower than the set threshold or is out of the set range and the diverse upstream port 324 signal level is also lower than the set threshold or is out of the set range, logic or code running on and executed by the controller 306 interprets that that both, the primary and diverse optical paths are damaged. This situation usually corresponds to an optical node transmitter fault; for example the transmitter 236 shown in FIG. 2. Consequently, the controller 306 will not provide the control signals to the outputs 315 and 317 and will not cause the optical switches 314 and 316 to change position to the diverse ports 324 and 326. A monitoring tool, implemented as code executed by the controller 306, will send an alarm notifying the operator about this situation and requiring appropriate diagnosis and corrective action. Communications to the operator may be by way of pager or telephone notification, email, or using any other proprietary reporting system that the cable company chooses to implement in the cable distribution system.

In one embodiment, for maintenance purposes, the OSS 300 allows the operator to manually force the switches 314 and 316 (and, correspondingly, the switches 318) into a desired position, regardless of the real conditions detected on the upstream ports 320 and 324. This manual override is performed via monitoring software (e.g., code) implemented in the controller 306, allowing only the operator with a certain degree of access or a certain clearance level to perform the override. For lower operator access levels, only readings of the optical parameters may be available. The operator interface with the OSS 300 may occur using any suitable system, including local input and output devices such as keyboards and monitors mounted in or around a cabinet of the OSS 300, or remotely using networking connections such as the Internet.

Figure 4:
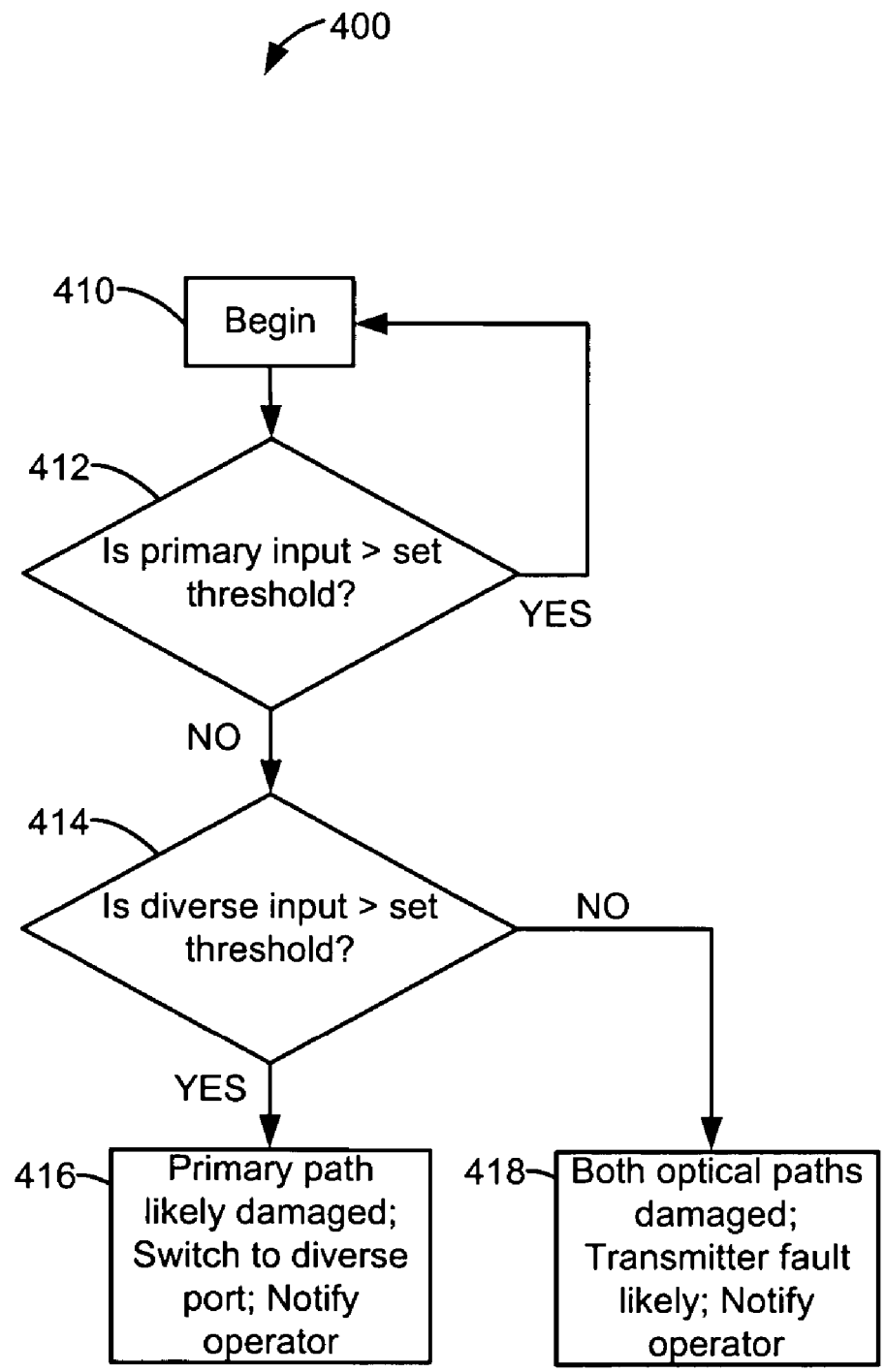
FIG. 4 shows in flow chart form a method in accordance with one embodiment of the present invention.

Reference is next made to FIG. 4, which shows in flow chart form a method 400 in accordance with one embodiment of the present invention. The method 400 would typically be embodied in computer readable code executed by the controller 306, shown in FIG. 3. The method 400 begins or is initiated (step 410) and immediately proceeds to determine whether the signal power of the primary input (e.g., the primary upstream port 320) is above a preset threshold or within a preset range. If the signal power is within desired parameters, the method simply loops endlessly between the steps 410 and 412 until such time as the signal power of the primary input is not above a preset threshold or not within a preset range. When the signal power of the primary input is not above a preset threshold or not within a preset range, the method 400 determines whether the diverse input (e.g., the diverse upstream port 324) is above the preset threshold or within the preset range (step 414). If the diverse input is not above the preset threshold or not within the preset range, the method 400 determines that both optical paths are damaged (step 418). Since the situation where both optical paths are damaged is unlikely (e.g., both the primary upstream path connected to the port 320 and the diverse upstream path connected to the port 324, which reside in separate sheaths), the method 400 interprets this as a likely transmitter fault (e.g., a transmitter such as the transmitter 236 shown in FIG. 2 not functioning properly) and notifies an operator of the fault. An operator would then investigate to determine whether the optical node is functioning properly and take any needed corrective action. If the diverse input is above the preset threshold or within the preset range, the method 400 determines that the primary path is damaged and switches to the diverse port (e.g., the diverse upstream path connected to the port 324 and the diverse downstream path connected to the port 326 by using the switches 314 and 316 controlled by the controller 306, shown in FIG. 3). In one embodiment, this switching operation is completed within 20 ms of the occurrence of the fault and the switching of any connected slave modules (e.g., the slave module 304 controlling the switches 318 at the direction of the master module 302, shown in FIG. 3) occurs within 2 ms of the switching performed by the master module 302.

While the present invention has been described in connection with master/slave configured modules controlling segmented downstream communications, it will be understood that the present invention is applicable to any configuration that has multiple primary fibers running through a single sheath and associated diverse fibers running through a separate sheath, where it would be beneficial to switch to diverse communications paths based on the conditions sensed on one or more of the fibers. The present invention is not limited to segmented downstream communications, but is merely described in an exemplary embodiment to be implemented in the context of segmented downstream communications.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An optical switching system comprising:
a master module having a controller, a transmitter portion for use with a transmitter, and a receiver portion for use with a receiver;
a slave module for distributing content in the optical cable distribution network having a controller and one or more transmitter portions for use with transmitters, the slave module controller being connected to the master module controller with a control line;
the master module transmitter portion for distributing content and having a first port for connection to a primary downstream path and a second port for connection to a diverse downstream path;
the master module receiver portion having a first port for connection to a primary upstream path and a second port for connection to a diverse upstream path;
each slave module transmitter portion having a first port for connection to an additional primary downstream path and a second port for connection to an additional diverse downstream path, at least a portion of the primary downstream path and at least a portion of at least one of the additional primary downstream paths being contained within a same sheath;
a first optical coupler for detecting an optical signal level provided to the master module receiver portion first port and providing a first electrical signal to a first input of the master module controller and a second optical coupler for detecting an optical signal level provided to the master module receiver portion second port and providing a second electrical signal to a second input of the master module controller;
one or more switches responsive to the master module controller for switching between the master module first and second ports; and one or more further switches responsive to the slave module controller for switching between the slave module first and second ports,
wherein the master module controller is configured to control the slave module over the control line to switch to the slave module first ports when switching to the master module first ports, and switch to the slave module second ports when switching to the master module second ports.

2. The optical switching system according to claim 1, wherein the master module controller provides one or more control signals to the one or more master module switches, causing the mater module switches to switch from the first ports to the second ports when the signal level of the first input is below a predetermined threshold.

3. The optical switching system according to claim 2, wherein the master module further provides a further control signal to the slave module over the control line when the signal level of the first input is below the predetermined threshold, causing the slave module controller to provide one or more control signals to the one or more slave module switches, causing the slave module switches to switch from the first ports to the second ports.

4. The optical switching system according to claim 3, wherein the predetermined threshold is a range and the master module provides the control signals to the master module switches and provides the further control signal to the slave module when the signal level of the first input is outside of the predetermined range.

5. The optical switching system according to claim 3, wherein the master module provides the control signals to the master module switches and provides the further control signal to the slave module when the signal level of the first input is below the predetermined threshold and the signal level of the second input is above the predetermined threshold.

6. The optical switching system according to claim 1, wherein the slave module has two or more transmitter portions, each transmitter portion of the master module and the slave module servicing a different segmented downstream portion of an optical cable distribution network.

7. An optical cable distribution system comprising:
a head end having a master module and one or more slave modules;
the master module having a controller, a transmitter portion for use with a transmitter, and a receiver portion for use with a receiver;
the slave module for distributing content in the optical cable distribution system having a controller and one or more transmitter portions for use with transmitters;
a control line connecting the slave module controller to the master module controller;
the master module transmitter portion for distributing content and having a first port connected to a first end of a primary downstream fiber and a second port connected to a first end of a diverse downstream fiber;
the master module receiver portion having a first port connected to a first end of a primary upstream fiber and a second port connected to a first end of a diverse upstream fiber;
each slave module transmitter portion having a first port connected to a first end of an additional primary downstream fiber and a second port connected to a first end of an additional diverse downstream fiber, at least a portion of the primary downstream path and at least a portion of at least one of the additional primary downstream paths being contained within a same sheath;

a first optical coupler for detecting an optical signal level provided to the master module receiver portion first port and providing a first electrical signal to a first input of the master module controller and a second optical coupler for detecting an optical signal level provided to the master module receiver portion second port and providing a second electrical signal to a second input of the master module controller;

one or more switches responsive to the master module controller for switching between the master module first and second ports; and one or more further switches responsive to the slave module controller for switching between the slave module first and second ports, wherein the master module controller is configured to control the slave module over the control line to switch to the slave module first ports when switching to the master module first ports, and switch to the slave module second ports when switching to the master module second ports.

8. The optical cable distribution system according to claim 7, further comprising:
a transmitter connected to a third port of the master module transmitter portion;
a receiver connected to a third port of the master module receiver portion; and
an additional transmitter connected to a third port of each slave module transmitter portion.

9. The optical cable distribution system according to claim 7, further comprising:
wherein the master module controller provides one or more control signals to the one or more master module switches, causing the master module switches to switch from the first ports to the second ports when the signal level of the first input is below a predetermined threshold, and the master module further provides a further control signal to the slave module on the control line when the signal level of the first input is below the predetermined threshold, causing the slave module controller to provide one or more further control signals to the one or more slave module switches, causing the slave module switches to switch from the first ports to the second ports.

10. The optical cable distribution system according to claim 9, further comprising:
one or more fiber optic splice closures for splicing together: a second end of the primary downstream fiber with a second end of the diverse downstream fiber forming a primary downstream pair, a second end of the primary upstream fiber with a second end of the diverse upstream fiber forming a diverse upstream pair, and a second end of each of the additional primary downstream fibers with a second end of a respective one of each of the additional diverse downstream fibers forming additional downstream pairs;
a receiver coupled to the second end of the primary and diverse downstream pair;
a transmitter coupled to the second end of the primary and diverse upstream pair; and
an additional receiver coupled to the second end of each of the additional primary and diverse downstream pair(s).

11. The optical cable distribution system according to claim 10, wherein the primary fibers are located in a different sheath from the diverse fibers.

12. The optical cable distribution system according to claim 10, further comprising:
one or more optical nodes comprising each of the receivers and transmitters located at the second ends of the fiber pairs.

13. The optical cable distribution system according to claim 9, wherein the predetermined threshold is a range and the master module provides the control signals to the master module switches and provides the further control signal to the slave module when the signal level of the first input is outside of the predetermined range.

14. The optical cable distribution system according to claim 9, wherein the master module provides the control signals to the master module switches and provides the further control signal to the slave module when the signal level of the first input is below the predetermined threshold and the signal level of the second input is above the predetermined threshold.

15. The optical cable distribution system according to claim 7, wherein the slave module is connected to two or more transmitters, each transmitter connected to the master module and the slave module servicing a different segment of the optical cable distribution system.

16. A method for controlling switching between primary and diverse optical paths in an optical switching network, having a master module and a slave module connected to the master module with a control line, the master module connected to a primary upstream optical path, a diverse upstream optical path, a primary downstream optical path, and a diverse downstream optical path, the slave module for distributing content in the optical cable distribution network and connected to an additional primary downstream optical path and an additional diverse downstream optical path, at least a portion of the primary downstream path and the additional primary downstream path being contained within a same sheath, the master module being configured to control the slave module over the control line to switch to the additional primary downstream optical path when switching to the primary downstream optical path, and switch to the additional diverse downstream optical path when switching to the downstream optical path, the method comprising the steps of:
monitoring a signal level of the primary upstream optical path;
determining if the signal level of the primary upstream optical path is above a set threshold; and
automatically switching from the primary downstream optical paths to the diverse downstream optical paths if the signal level of the primary upstream optical path is below the predetermined threshold.

17. The method according to claim 16, the method further comprising the steps of:
monitoring a signal level of the diverse upstream optical path; and
determining if the signal level of the diverse upstream optical path is above the set threshold,
wherein the step of automatically switching from the primary downstream optical paths to the diverse downstream optical paths is performed if the signal level of the primary upstream optical path is below the predetermined threshold and the signal level of the diverse upstream optical path is above the predetermined threshold.

18. The method according to claim 17, wherein the threshold comprises a range, and the switching from the primary downstream optical paths to the diverse optical paths is performed if the signal level of the primary upstream optical path is outside of the range and the signal level of the diverse upstream optical path is within the range.

* * * * *

UNITED STATES PATENT AND TRADEMARK OFFICE
CERTIFICATE OF CORRECTION

PATENT NO. : 7,630,597 B2  Page 1 of 1
APPLICATION NO. : 11/442863
DATED : December 8, 2009
INVENTOR(S) : Robert Beaver It is certified that error appears in the above-identified patent and that said Letters Patent is hereby corrected as shown below:

Column 10, line 13, by deleting the word "mater" and substituting therefore the word --master--.

Signed and Sealed this

Second Day of February, 2010

David J. Kappos
*Director of the United States Patent and Trademark Office*